United States Patent [19]

Pearce et al.

[11] 4,056,897

[45] Nov. 8, 1977

[54] PLANTER DESIGN AND CONSTRUCTION

[76] Inventors: Mary Ellen Pearce; John Scott Pearce, both of 8800 Burbank Road, Annandale, Va. 22003

[21] Appl. No.: 643,233

[22] Filed: Dec. 22, 1975

[51] Int. Cl.² ............................................. A01G 9/02
[52] U.S. Cl. ......................................... 47/39; 47/79; 108/111; 248/150; 248/174; D11/155
[58] Field of Search .................... 47/34, 34 T, 38, 1, 47/2, 79-81, 39; D30/68, 10, 11, 12; D6/172, 190, 182, 114; 108/11, 14, 111, 159; 40/124.1; 248/174, 150; 211/72, 177, 189; 206/45.24, 45.27, 44 R; 220/85 H; 119/5, 15

[56] References Cited

U.S. PATENT DOCUMENTS

| D. 159,661 | 8/1950 | Newcome | D30/11 |
|---|---|---|---|
| D. 228,360 | 9/1973 | Sunshine | D30/6 |
| 728,088 | 5/1903 | Dillon | 47/79 |
| 1,832,801 | 11/1931 | Wright | 211/189 X |
| 1,879,837 | 9/1932 | Bierlich | 248/174 X |
| 2,188,875 | 1/1940 | Ellis | 47/79 |
| 2,198,150 | 4/1940 | Barnhart | 47/1.2 |
| 2,235,290 | 3/1941 | Exline et al. | 108/159 |
| 2,343,010 | 2/1944 | Hebert | 47/38 |
| 2,347,821 | 5/1944 | Goldner | 108/159 |
| 2,983,076 | 5/1961 | Merrill | 47/79 |
| 3,468,288 | 9/1969 | Cassil | 119/5 |
| 3,651,975 | 3/1972 | Callan | 220/4 T |
| 3,903,642 | 9/1975 | Yellin | 47/34 T |

OTHER PUBLICATIONS

Kramer, Jack. *The Indoor Gardeners How to Build It Book* Published by Simon and Schuster, N.Y. 10020 11-29-74, pages: cover, title pp., 21-28, 42, 43, 50-53, 68-69.

"Do It Yourself with Plexiglas Acrylic Sheet" ad Pamphlet of Rohm and Haas, Philadelphia, Pa. Printed in U.S.A., 1969.

*Primary Examiner*—Clifford D. Crowder
*Assistant Examiner*—James R. Feyrer
*Attorney, Agent, or Firm*—Sixbey, Bradford & Leedom

[57] ABSTRACT

A versatile and ornamental planter design and construction, and a method of manufacture thereof, the planter design being susceptible of specifically different configurations and sizes for maximal usage possibilities from the standpoint of aesthetics and decor in different environments, and which is preferably constructed of a material such as Plexiglas or a thermoplastic, which can be clear, translucent, or colored to fit in varied decor and/or design motifs of a room or place of use. The planter can serve as an article of furniture, rendering a most attractive appearance by virtue of the design and construction and being extremely versatile, susceptible of usage with various types and sizes of plants which may vary in environmental and growing conditions and requirements, especially as to moisture and sunlight, and the construction being such as to provide enhanced structural strength and optimum utilization of the materials of construction.

15 Claims, 7 Drawing Figures

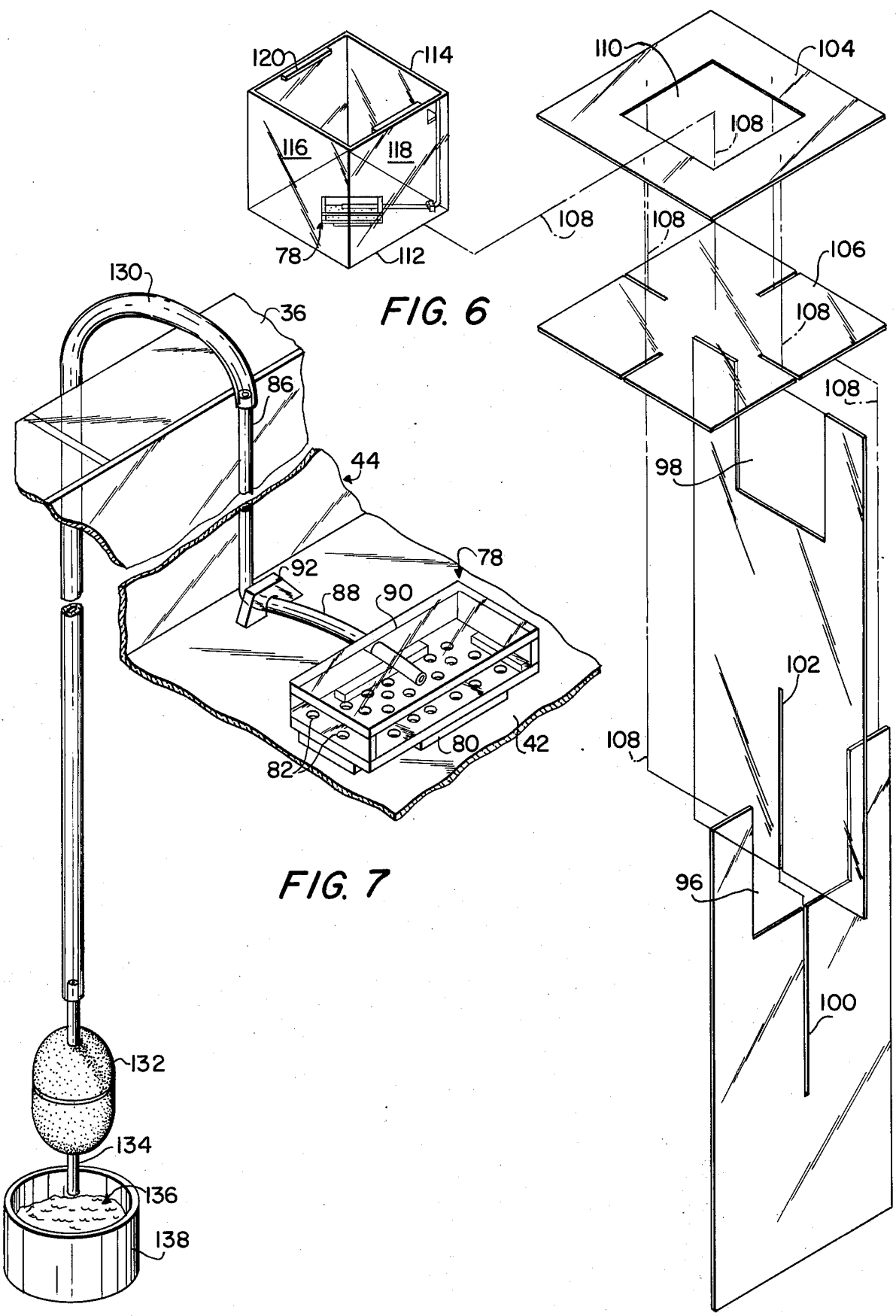

PLANTER DESIGN AND CONSTRUCTION

BACKGROUND OF THE INVENTION

In the past many private and public individuals and designers have made use of plants of various types in order to enhance the appearance of living, working and other areas leading to a more enjoyable living and working environment. Such plants have frequently involved the usage of containers or holders for the plants which were not entirely satisfactory from the standpoint of construction and/or aesthetics. Such devices have for example included the use of stands for containing individual plants or the like in pots susceptible to easy breakage and creating difficulties of appropriate handling and controlled growth of the plants. Many other types of planters have been utilized many of which are devised to contain directly therein a plant or plants which creates problems of moisture control and the like. Other usages of varying types of containers have been unwieldy and not susceptible of placement in an area with other furniture or decorations so as to result in an overall pleasing appearance.

It is a primary object of the present invention to overcome these past difficulties and to provide for an extremely versatile and ornamental planter design and construction overcoming drawbacks of the previous constructions and which in itself can well serve as an article of furniture which is capable of very versatile usage and arrangement within a given area and susceptible of usage and controlled growth of different types and sizes of plants. One of the more interesting characteristics of the invention resides in utilization of a material of transparency not only in the overall planter construction but in a removable plant container portion per se. The transparency permits visual inspection and control of certain aspects of the planter and plant therein and the overall construction is such as to render it extremely useful and versatile in changing and arrangement of decor within an area.

SUMMARY OF THE INVENTION

In essence the present invention relates to a planter construction and design in the nature of a piece of furniture which can be utilized in conjunction with other furniture to provide extremely interesting and decorative arrangements in rooms such as living quarters and the like. The invention consists basically in two portions, one being a support or supporter portion which serves as a basic furniture component and detachably mountable therein a planter or container for a plant or vegetation of a desired type.

The present design is of extreme modern decor in the utilization of a design based on cubism for effective appearance and the overall unit and plant container per se are preferably constructed of a transparent material in the nature of Plexiglass, a trade name for a light weight thermo plastic acrylic resin, or other transparent thermoplastic material and which further can include a coloring material to render very pleasing effects in the overall container.

In a preferred embodiment the overall container is manufactured of Plexiglass in which the cubism design is incorporated and the design being such that the specific plant or vegetation container is readily removable and in which, in use, the root structure of the plant is readily visible. The design can be either single, double, or otherwise varied to suit individual needs and requirements.

The plant or vegetation container per se is waterproof in construction so as to hold water therein and is provided with watering means extending to the exterior of the overall structure and is of such a nature that an excess amount of moisture which can be readily detected through the transparent material, can be removed from the container to thereby prevent plant root damage through too much moisture. Means are additionally provided in this plant container, and in the means for filling or removing moisture, whereby material contained in the base portion of this container in conjunction with an additive filtering type construction prevents the watering or de-watering device from becoming inoperative due to a clogging of the tube with the earth or material in which the plant is growing.

More specifically the overall construction which constitutes a unit of furniture can be varied specifically from single to double concepts, and the ultimate usage thereof as a piece of furniture is therefore susceptible of very versatile arrangements of furniture and other decor in a room in which placed.

The construction as briefly alluded to above provides for increased control of conditions for optimum growth and beauty of a plant through moisture control and through visibility from the exterior. The root condition can be readily viewed from the exterior and this results in the possibility of root pruning for enhanced growth, or to consider the possible health of the plant per se. Basically the overall construction resulting in a furniture piece or unit which includes the additional feature of a planter can be used for alternative emphasis but the overall composite has magnificent possibilities.

The construction is such that readily available sheets of material are utilized to manufacture the construction and the optimum usage of the material in the sheet is made. The overall structure is provided with substantial structural strength due to utilization of U-shaped saddle structures and other interfitting of components which include utilization of adhering materials such as adhesives or glues in the formed structure.

The present invention due to its construction and the materials utilized therein provides an item of substantial interest in relation to maintaining a view of development of the root and vegetation structure. In a preferred embodiment a top panel surrounds the removable plant or vegetation container per se, with this panel providing in the top plane of the overall container a support which serves to give a spreading and/or sweeping graceful and arrangeable support for enhanced support of the plant per se, and for overall appearance, with the plant structure upon reaching the termination of this plane gracefully downwardly bending and flowing fallingly in a supportive effect.

For enhanced dress the edges are ground and improved strength for fitting etc. are incorporated.

Additional objects, advantages and features of the present invention will be more readily apparent from the following detailed description of embodiments thereof when taken together with the accompanying drawings in which:

FIG. 6 is an exploded view similar to FIG. 3 but disclosing in detail the embodiment of FIG. 4; and FIG. 7 is a fragmentary perspective view of a means for controlling moisture content in the plant container and primarily directed to a device and means for removing moisture from the plant container.

Figure 1:
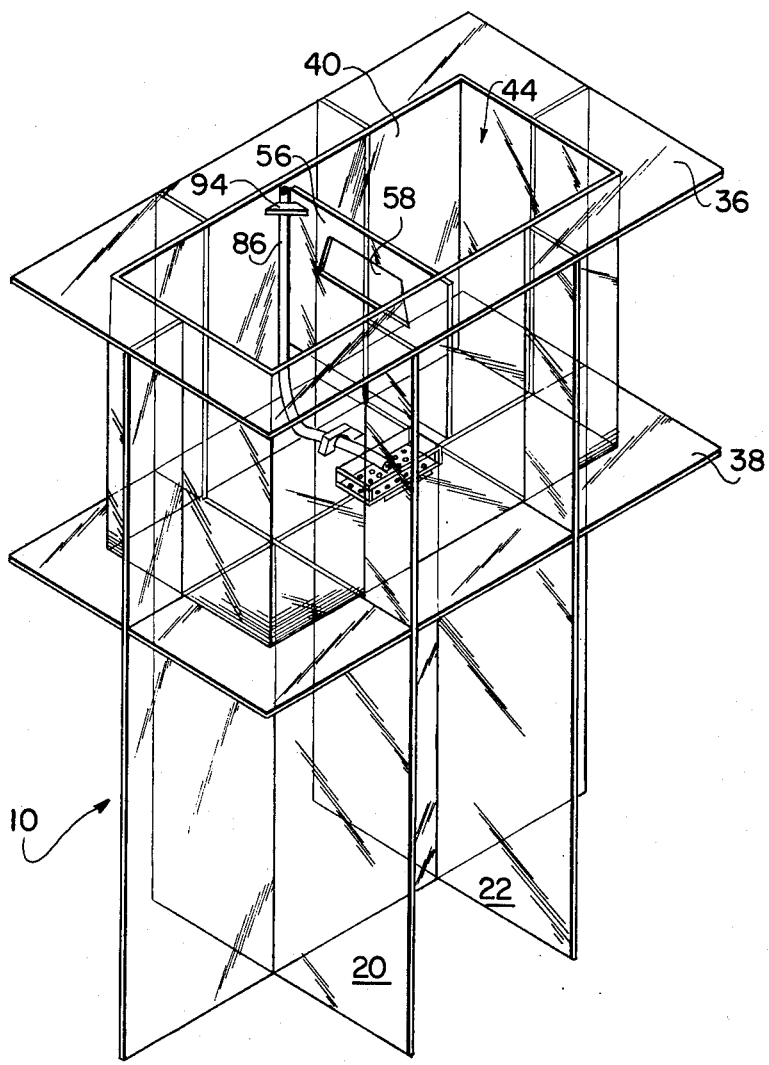
FIG. 1 is a perspective view of the overall construction including the furniture unit and the removable plant container mounted therein showing the nature of transparency and utilization of the cubism theory of art.

Referring to the drawings, two embodiments of the planter construction or design are shown. In FIG. 1 for example a double unit is disclosed which is based upon the use of two supporting aligned cradles which interlock with an additional long cradle and constitute the supporting base for the planter.

Figure 4:
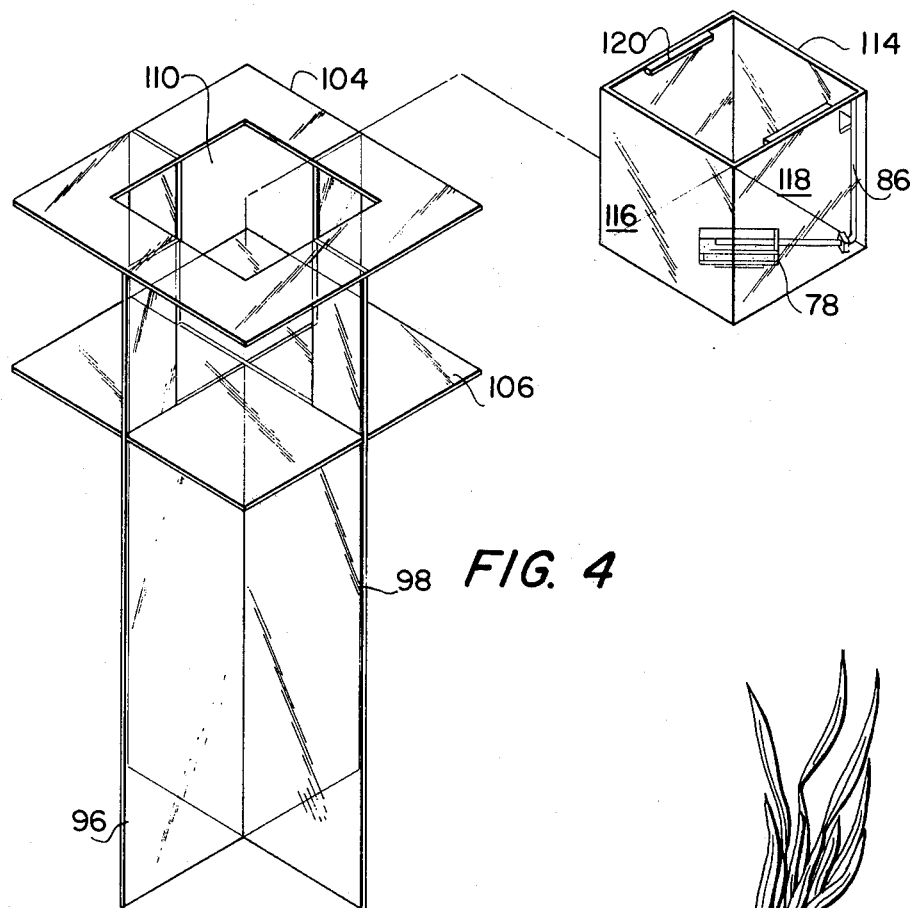
FIG. 4 is a perspective view of a modification of the invention disclosing a single as distinguished from a plural unit and disclosing the plant container per se separate from the furniture piece unit.

In FIG. 4 there is disclosed a single planter, so-called, which includes the use of two intersecting cradle members as a support for the planter or container per se. While specific dimensions of the individual pieces of material such as Plexiglass will not be hereinafter detailed, it is of significance to note that the design and dimensions of the individual styles are so devised as to utilize the least amount of material such as Plexiglass, and the design is such that portions of an overall or larger sheet cutout are utilized to form other portions or parts of the overall structure. As the detailed explanation follows this will become readily apparent. The materials such as Plexiglass must have a sufficient thickness such as 3/16 inches in order to provide adequate stability and strength and this material therefore is quite expensive.

Referring now to FIG. 1 the overall structure of the double base planter or double size planter includes a long cradle 10 which has a cutout at 12 and slots 14 and 16 extending downward from the base 18 of cutout 12. As this explanation continues the cubism art used as a basis for the design must be borne in mind. This so-called long cradle 10 serves as a portion of the base support. Two short cradles 20 and 22 have cutout areas 24 and 26 in a manner similar to the cutout 12. In actuality the parts referred to as cradles are primarily directed to these recesses or cutout portions which do in effect, as will appear hereinafter, form cradles for mutual inter-support and fixation of the various parts and portions of the base for supporting the plant container or planter per se. The short cradles 20 and 22 include, respectively, slots 28 and 30 formed in the base thereof. As will be noted from broken lines 32 and 34 when assembling the overall unit these slots 28, 30 respectively are intermeshed with and in slots 14, 16 to thereby form the base of the unit as generally indicated at 36 in FIG. 1.

This base structure also includes a top horizontal plane 36 and a lower horizontal plane 38. The top horizontal plane has a central cutout 40 which is of such dimensions as to serve as the base or bottom 42 of the waterproof planter or container generally designated 44. The lower horizontal plane 38 has a plurality of slots 46 formed inwardly from the periphery thereof with two designated 46a formed in the long sides and slots 46b in the shorter sides or ends.

The cutouts 24, 26 of cradle sides 20, 22 form the ends 48, 50 respectively of the container 44. One long side 52 of container 44 is formed from cutout 12 of lower cradle 10. The other long side 54 of container 44 is formed from an additional piece of material.

A so-called handle 56 is inserted in and adhered to the interiors of sides 52 and 54 respectively and includes in the upper portion thereof a hand hole or opening 58. The broken lines over and above those designated 32, 34 indicate respectively the assembly of the overall unit. The lines 60 and 62 designate the insertion of portions 64, 66 of lower cradle 10 passing through slots 46b of lower horizontal plane 38 and terminating as a support in the lower plane of the top horizontal plane 36. The lines 68 designate the interposition of the upper ends or legs 70 of shorter cradles 20, 22 inserted through slots 46a of lower horizontal plane 38 and serving as a support to the underside of the top horizontal plane 36. The overall assembly of the base is as hereinabove described and the planter or container per se 44 is adapted to pass through central cutout 40 in the top horizontal plane which extends outwardly peripherally around the upper open end 72 of container 44 and serves as will appear hereinafter as a support medium for plants or the like. The base or bottom 42 of the planter 44 rests upon the central portion 74 of lower horizontal plane 38 being positioned as indicated by broken line 76.

Figure 3:
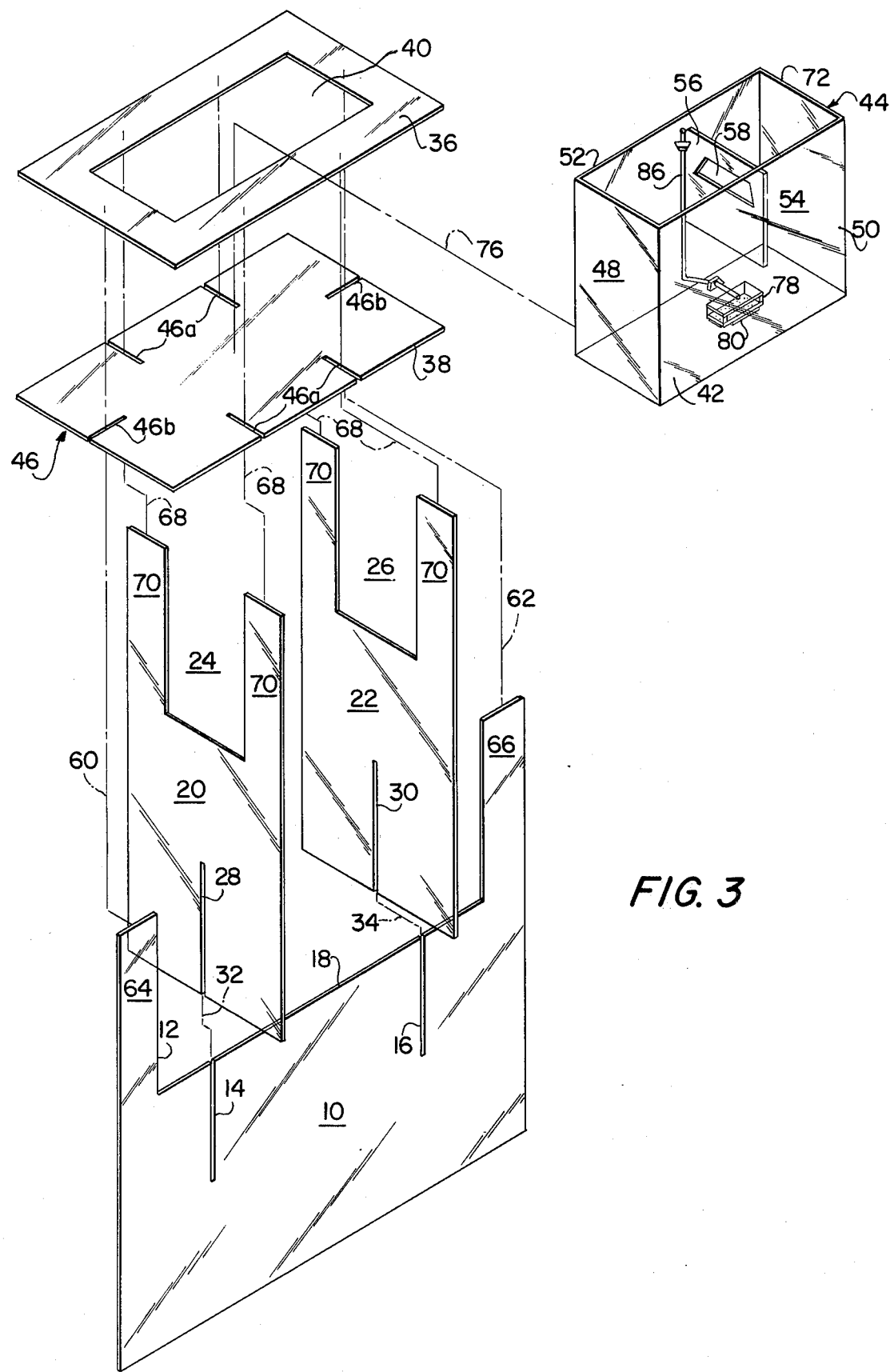
FIG. 3 is an exploded view of the structure of FIG. 1 showing the component portions in an unassembled condition and which indicates the utilization of portions of a sheet of the material and the manner of assembly and support of the individual portions thereof, the plant container per se being separately shown.

This overall assembled construction can be readily seen and appreciated from FIG. 1 in conjunction with FIG. 3 which shows the various cutouts and interfitments of the individual pieces and the utilization of substantially all of the material. The utilization of the large cradle with the shorter cradles, and the interfitting of portions thereof in the slots as hereinbefore defined with respect one to another and with the slots of the lower horizontal plane, and affixation to the base of the top horizontal plane form a sturdy and substantial base for containment of the container or planter 44 and plants contained therein. It is to be noted that each of the edges of the individual parts are sanded and smoothed by buffing for example which adds to the impact resistance and appearance of the planter panels and all points that touch one another must be cemented with a transparent adhesive. The so-called double planter shown in FIGS. 1 and 3 has as one of the outstanding and necessary characteristics thereof the fact that the long cradle and the two shorter ones interlock as indicated. The interlocking of the three cradles combined with the two horizontal planes adds considerable structural strength and rigidity to the planter.

Figure 2:
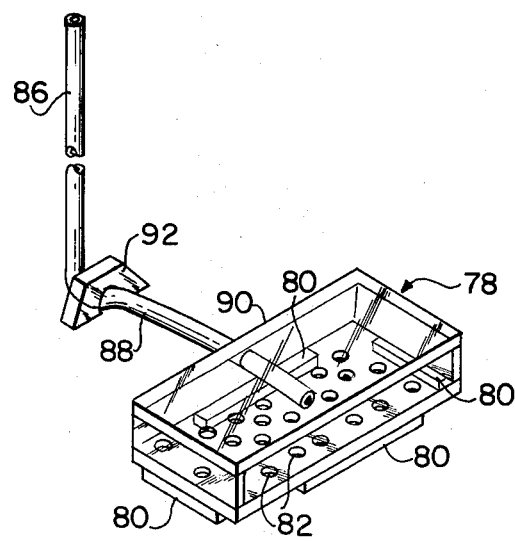
FIG. 2 is an enlarged perspective view of structure which permits moisture control within the plant container as arranged in the bottom thereof and provided with an outlet to the exterior.

Disposed within the waterproof planter or container per se 44 is a watering and draining device. This includes a box shaped unit generally designated 78 supported above the interior bottom of container 44 by means of plates 80 or the like and this box shaped unit is closed with the exception of a plurality of bores or holes 82 formed in the bottom thereof. The structure and function is apparent from FIGS. 2 and 7 of the drawings. A so-called standpipe 86 has a portion 88 which extends horizontally through an opening formed in a side 90 of the box 78 and being open at its inner end within the interior of box 78. A brace or bracket member 92 is affixed to the interior of the base of container or planter 44 and an additional brace in the nature of a corner brace designated 94 adhered between an inner side wall and handle 56 as shown in FIG. 1 maintains the uppermost position of the standpipe portion 86. The operation and function of this portion of the structure will be more specifically explained in detail later in the application with respect to FIG. 7 of the drawings.

Figure 5:
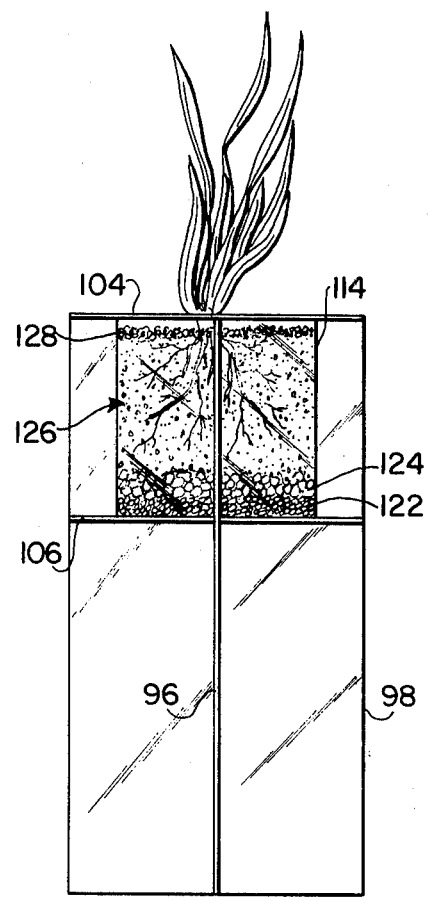
FIG. 5 is an elevational pictorial representation of the embodiment of FIG. 4 showing the plant container per se incorporated in the furniture piece and, due to the transparency of the construction material, disclosing a plant with the root structure thereof within the container having soil and other materials therein.

In essence the embodiment of FIGS. 4, 5 and 6 are similar in concept to the above described double embodiment. This latter embodiment however is a so-called single planter. In the single planter the various portions or parts include a lower cradle 96 and an upper cradle 98 which are provided with mating slots 100, 102 respectively. A top horizontal plane 104 and a lower horizontal plane 106 are basically the same as the horizontal planes 36 and 38 of the preceding double form embodiment. The broken lines all generally designated 108 disclose, in the same manner as in the previous embodiment, the method of assembly of this single unit. It is again to be noted that the cutout portion 110 forms base 112 of container 114 which is in the nature of a planter per se similar to the unit 44 of the preceding embodiment and the cutouts at the upper parts of the upper and lower cradle from two sides indicated at 116 and 118. A unit 78 is disposed in the base of the planter 114 in a manner similar to the preceding embodiment and this container includes handles such as at 120.

Again in this single embodiment the structural relationship and assembly of the interlocking cradles is such that a unique, strong and aesthetic cradle is provided for the plant container 114 per se and in this embodiment as in the preceding embodiment the art form of cubism is the basis for the design.

Referring now to FIG. 5 of the drawings a preferred makeup of the various layers or materials in the plant container 44 is shown and which is the same as in the unit 114. This includes a bottom layer consisting of charcoal chips 122 on top of which is a layer of marble chips 124 which preferably can be white for contrast with the charcoal chips. Above the layer of marble chips 24 is the material in which the plant is operatively inserted with respect to its roots. This material generally indicated by 126 includes a mixture preferably consisting of, for example, one-third potting soil, one-third perlite and one-third peat moss. Above this is a further layer 128 which can consist of the usual house plant mulch. It has been found that this combination which can be used in conjunction with any desired plant additive serves very well for growing of different types of plants and manifestly variations and additions can be made depending upon the actual plants or vegetation to be contained and grown within the planters. The charcoal and marble chips respectively allow the drain as shown in FIG. 7 to be used to remove excess water. The charcoal chips and marble would extend above the box shaped unit 78 mounted within the container. The standpipe 86 is intimately connected to a plastic tube 130. This plastic tube is tightly fitted on the drain consisting of the standpipe 86 at the top of the plant container. The tube must be long enough to extend below the bottom of the plant container in order to start a gravity flow of water. A flexible bulb 132 is attached at the lower end of plastic tube 130 and an outlet tube 134 below the bulb serves to exit excess water generally designated at 136 into a container in the nature of a can or bucket as shown at 138. As indicated above the material included in the container as shown and described with reference to FIG. 5 provides a medium in which the drain of water would be most effective. The sides of the container 44 or 114 are transparent and this transparency serves several unique functions. For one, as shown in FIG. 5, the root structure of a plant is visible through the side of the container so that the health condition, etc., of the plant can be readily ascertained from the exterior. Also due to the possibility of viewing the root structure a careful gardener or the like can prune the root structure as is necessary. Additionally the growth of the root structure serves as a most interesting phenomenon. At the same time the system including the box 48 and standpipe 86 serve a very useful purpose since it can be used to observe excess water from the level of the water in the standpipe and which is visible from the outside of the plant container. The charcoal chips tend to deodorize the standing water and excess water can be readily removed with the simple bulb syphon attached to the plastic tube and which in turn is tightly fitted on the drain at the top of the plant container.

Preferably the planter or container per se has the top thereof terminating at the upper plane of the top horizontal platforms or planes, and for certain types of plants such as ferns and the like the various branches can extend over the platform and then gracefully bend downwardly to give a downward extending sweeping or flowing appearance thereto. The top platform of course serves as a support for such limbs and in effect sets up the graceful draping of these limbs.

The structure and design permits use of the above described apparatus in many decorative arrangements and designs within rooms or spaces containing the units, and the cubism design and nature of the material and assembly thereof add to the attractiveness and usefulness of the overall units. Basically the units comprise a piece of furniture with the additional attraction or feature of the planter and can be used for alternative emphasis, and the overall composite of the furniture and plant container can serve magnificent decorative possibilities as will be readily apparent.

The utilization of the transparent material and/or incorporation therein of different colors provides additional versatility as will be apparent. Caution should be used when moving the units which should be moved using the base portions as the holding areas and which constitute the base of the unit and have the greatest strength area. As pointed out above all interconnecting points and areas are adhesively secured one to another.

While preferred embodiments have been hereinabove described and shown in the drawings manifestly minor details of construction can be effected in the invention without departing from the spirit and scope thereof as defined in and limited solely by the appended claims.

We claim:

1. A planter comprising:
A. a plant container including interconnected sides and a bottom, all being formed of rigid transparent plastic material, said container being adapted for at least partly containing therein a plant together with plant life supporting material;
B. said container being waterproof for containment of water therein;
C. a hollow filter box with closed sides and a closed top and having perforations in the bottom thereof;

D. said filter being supported above the inner side of said container bottom and beneath plant life supporting material in said container; and E. means placing said filter box in fluid communication with the planter exterior for controlling the amount of water within said container.

2. A planter as claimed in claim 2, wherein the water amount control means includes a tube operatively connected at one side to said filter box, and having a flexible bulb pump at the free end externally of the planter adapted for controllably withdrawing water from said planter through said filter.

3. A planter as claimed in claim 1, a flexible transparent tube having one end thereof extending to a position external of said plant container and being visible from the exterior of said plant container through a transparent wall thereof, the amount of water within the plant container being visible in the tube from the exterior, and means for controlling the visually discerned water amount.

4. A planter as claimed in claim 3, further including a controllable flexible bulb pump attached to said flexible tube exterior of said plant container and operable for removing water therefrom.

5. A functional and decorative furniture entity including a planter comprising in combination:

A. a furniture piece support portion including:
1. at least two planar members consiting of rigid transparent plastic material;
2. each planar member having a U-shaped cradle-like cut-out in the upper edge thereof;
3. said planar members respectively having slots extending inwardly from edges thereof;
4. said planar members being matedly interconnected and interlocked by coaction between interengaged slots of two or more separate ones of said members positioned at an angle to one another;
5. said cradle-like cut-outs coacting, in assembled relationship of said members, to form an open top composite cradle for supporting a plant container;

B. a removable plant container seated and supported in said composite cradle and adapted for at least partly containing therein a plant together with plant life supporting material, said plant container consisting of interconnected sides and a bottom formed of rigid transparent plastic material whereby that portion of a plant and its plant life supporting material are visible from the exterior;

C. said composite cradle and said plant container having respectively interior and exterior shapes and dimensions to supportedly mate and engage the container in the cradle with the edges of the cradle forming members being in linear contact with the peripheral sides of said container over substantially the entire height thereof;

D. said plant life supporting material including a soil mix adapted for containment therein of a plant root;

E. said container being waterproof for containment of water therein;

F. a hollow closed side filter box having perforations in the bottom side thereof and supported above the interior side of said bottom;

G. a layer of charcoal chips on the bottom of said container;

H. a layer of marble or the like chunks on said charcoal chips;

I. said soil mix being on top of said marble layer; and

J. means for controlling the amount of water within said container.

6. A planter as claimed in claim 5, said charcoal layer and said marble layer at least partially surrounding said filter box to permit removal of excess water through said flexible tube and the charcoal serving for water deodorization.

7. A composite functional and decorative furniture entity including in combination a furniture piece and a planter removably associated therewith comprising:

A. a furniture piece planter support portion including:
1. at least two vertical planar members consisting of rigid transparent plastic material;
2. said planar members having horizontal flat upper edges;
3. each vertical planar member having a downward depending central U-shaped cradle-like cut-out in said upper edge, with a flat horizontal base edge in the cut-out, and horizontal flat edge portions external of said cut-out;
4. said planar members having slots extending inwardly respectively upwardly and downwardly from edges thereof;
5. said planar members being matedly interconnected and interlocked by coaction between interengaged slots of two or more separate ones of said planar members positioned at an angle to one another;
6. said cradle-like cut-outs coacting, in the so interconnected relationship of said members, to form an open top composite cradle with said flat base edges in the cut-out coacting to constitute a horizontal support surface;
7. a lower horizontal planar member having slots extending inwardly from the periphery thereof, said horizontal planar member being supportedly positioned on said horizontal support surface, with said slots therein matedly interengaging the side edges of said cut-outs for interconnection of said lower horizontal planar member with said vertical planar members, and constituting a planter support;

B. said planter including a plant container removably seated and supported on said support surface in said composite cradle and adapted for at least partly containing therein a plant, together with plant life supporting material, said plant container consisting of interconnected sides and a bottom respectively formed of rigid transparent plastic material whereby that portion of a plant and its plant life supporting material are visible from the exterior;

C. said composite cradle and said plant container having respectively interior and exterior shapes and dimensions to supportedly mate and engage the plant container in the composite cradle, with said side edges of the cut-outs being in positionment contact with the external sides of said container over substantially the entire height thereof;

D. an upper horizontal planar member having a central opening therein of a size and shape corresponding to the open top of said composite cradle, and an outer peripheral edge supportedly mounted on said horizontal flat portions of said vertical planar members;

E. said outer peripheral edge of said upper horizontal planar member and the upper edge of said plant container being substantially co-planar whereby portions of plants in said container can extend thereover, and can be at least in part supported thereby, and ends thereof drape downwardly therefrom.

8. A planter as claimed in claim 7, said plastic material including coloring.

9. In a planter construction as claimed in claim 7, all said sheets constituting the support being adhesively secured with a transparent adhesive at the points of contact thereof one with another to thereby form a unitary structure and wherein all outside edges are sanded and buffed which adds to impact resistance and overall appealing appearance of all said panels in assembled form.

10. In a planter construction as claimed in claim 7, wherein said vertical members include a central longitudinally extended sheet having an elongated large U-shaped cutout extending downwardly from the top thereof, two additional ones of said vertical members and the remaining vertical surfaces of said central member above the base of said cutout extending into grooves formed within said lower wall and being adhered thereto.

11. In a planter construction as claimed in claim 10 and constituting a double planter, a long cradle being formed in said central sheet and shorter cradles being formed in the additional two sheets, the latter being arranged at spaced right angles with said central sheet to form a composite cradle.

12. A planter as claimed in claim 7, said plant life supporting material including a soil mix adapted for containment therein of a plant root, said container being waterproof, a hollow closed side filter box having perforations in the bottom side thereof and supported above the interior bottom of said bottom, a layer of charcoal chips on the interior bottom of said container and a layer of marble or the like chunks thereover, with said soil mix being on top of said marble layer, and means for controlling the amount of water within said container.

13. A planter as claimed in claim 12, a flexible transparent tube having one end thereof extending to a position external of said plant container and being visible from the exterior of said plant container through a transparent wall thereof, the amount of water within the plant container being visible in the tube from the exterior, and means for controlling the visually discerned water amount.

14. A planter as claimed in claim 13, further including a controllable flexible bulb attached to said flexible tube exterior of said plant container and operable for removing water therefrom.

15. A planter as claimed in claim 14, said charcoal layer and said marble layer at least partially surrounding said filter box to permit removal of excess water through said flexible tube and the charcoal serving for water deodorization.

* * * * *